Patented Aug. 9, 1927.

1,638,220

UNITED STATES PATENT OFFICE.

WINFIELD SCOTT, OF AKRON, OHIO, ASSIGNOR TO E. I. DU PONT DE NEMOURS & COMPANY, OF WILMINGTON, DELAWARE, A CORPORATION OF DELAWARE.

VULCANIZATION OF RUBBER.

No Drawing. Original application filed December 19, 1922, Serial No. 607,883. Divided and this application filed April 23, 1924. Serial No. 708,336.

This invention relates to the vulcanization of rubber, gutta percha, and the like, and comprises a process of vulcanizing in which there is used as an accelerator the formaldehyde derivative of the condensation product of an amine (for example, a primary aromatic amine) and a straight chain aldehyde.

This application is a division of my application, Serial No. 607,883 filed Dec. 19, 1922.

The reaction mixture of equimolecular proportions of acetaldehyde and aniline is a sticky, viscous oil that soon turns a dark red on exposure to the air. Upon drying in air or on long storage this syrupy material decomposes to some extent, becoming rather dark in color, with the formation of phenylcarbylamine.

By using an excess of acetaldehyde, e. g. 1½ or 2 moles for each mole of aniline, a more viscous product is obtained, which upon drying in air, becomes quite dark in color, due to a slight decomposition. This material is a soft resin, and almost black in color. It readily softens from the heat of the hand and is rather sticky when warm.

Sticky products are also obtained when other aldehydes having a plurality of carbon atoms, such as propionaldehyde and butyraldehyde, are condensed with aniline, and when acetaldehyde, propionaldehyde, and others, are condensed with other aromatic amines such as the toluidines.

I have discovered that formaldehyde will react with condensation products of aromatic amines and straight chain aldehydes having more than one carbon atom, to form substances of complex molecular structure which are harder, and are more readily handled, than the original condensation products, and possess at least as good accelerating power. Thus I have found that formaldehyde will further react with the product obtained from the reaction of aniline and an excess of acetaldehyde to form a material of a hard brittle nature at ordinary temperatures which does not soften when pressed between the fingers and is quite stable. The color of this product in powdered form is yellow to brown, whereas the resin obtained from aniline and acetaldehyde alone, when ground at low temperatures, is a dark reddish brown color.

Evidence of an action of formaldehyde toward the reaction product of aniline and acetaldehyde is shown by a rise in temperature after the addition of formaldehyde, and an increase in the viscosity of the heated product, as well as less stickiness before drying. The product which has been described above cannot be prepared by the action of acetaldehyde or of methylene-diphenyl-diamine or of anhydroformaldehyde-aniline on the condensation product of acetaldehyde and aniline. Neither is the reaction product of aniline and a mixture of acetaldehyde and formaldehyde the same as that mentioned above. A mixture of formaldehyde and acetaldehyde reacts with aniline to form the Schiff's bases of the respective aldehydes.

The reaction product of acetaldehyde and aniline which has been resinified by formaldehyde has several distinct advantages over ethylidene-aniline as an accelerator of vulcanization. The resinous material is easily handled, weighed and removed from containers. With the syrupy or more viscous ethylidene-aniline a special effort must be made to remove all the material from pans or containers into which it is weighed before the milling operation. If master batches of rubber and ethylidene-aniline are made, extra time, labor, and power are required and this is obviated by use of the formaldehyde resinified material which may be milled into each batch of rubber and compound directly.

Aside from the ease of handling and mill room operation, this formaldehyde-reaction product has other distinct advantages over the material obtained from acetaldehyde and aniline alone, in that it contains less of a product that is relatively inactive during vulcanization and which has somewhat of a softening effect on the cured product. Rubber vulcanized with the formaldehyde-resinified product shows a higher tensile strength at the "optimum cure" as well as higher "ultimate tensile".

The more beneficial effect of the formaldehyde reaction product over syrupy ethylidene-aniline can be shown in general in a vulcanization test with the following formula:

| | Parts by weight. |
|---|---|
| Smoked sheet rubber | 100.0 |
| Sulfur | 3.5 |
| Zinc oxide | 3.0 |
| Accelerator | 0.30 |

Table 1 below indicates the tensile strength and ultimate elongation obtained on cures made simultaneously on the two samples at fifteen minute intervals from fifteen minutes to one hour and thirty minutes. Each tensile and elongation figure represents the average of four tests. Column I represents syrupy ethylidene-aniline, while column II shows the data obtained from the material prepared from the action of formaldehyde on the reaction product of one mole of aniline and one and one-half moles of acetaldehyde. Tensile strength is represented in pounds per square inch and elongation in percent. Fractions of pounds and percent elongation have been disregarded.

Table I.

| Time of cure in mins. at 141.5° C. | 1. | | 2. | |
|---|---|---|---|---|
| | Ten. | Elo. | Ten. | Elo. |
| 15 | 1568 | 894 | 2224 | 891 |
| 30 | 2309 | 805 | 2587 | 763 |
| 45 | 2340 | 835 | 2958 | 790 |
| 60 | 2377 | 786 | 3058 | 757 |
| 75 | 2556 | 826 | 3098 | 780 |
| 90 | 2639 | 792 | 3197 | 768 |

The stress strain data on the cure obtained in thirty minutes at 141.5° C. is shown in Table 2. The average tensile strength in pounds per square inch on four test pieces is shown for each 100% elongation. Column I shows the data obtained on the ethylidene-aniline, while column 2 represents the formaldehyde-resinified material.

Table II.

| Elongation (%). | I. | II. |
|---|---|---|
| | Tensile. | Tensile. |
| 100 | 12 | 12 |
| 200 | 24 | 25 |
| 300 | 57 | 83 |
| 400 | 106 | 158 |
| 500 | 196 | 336 |
| 600 | 587 | 850 |
| 700 | 1159 | 1737 |
| 800 | 2150 | |

Tensile and elongation at break is shown in Table I. Both Table I and Table II show the superiority of the new material.

The process of making the new accelerators may be illustrated by the following example:—

Sixty-six parts (by weight) of acetaldehyde is run slowly into ninety-three parts (by weight) of aniline in a suitable container equipped with a cooling jacket, stirrer and condenser. The temperature of the mixture is allowed to rise gradually by its heat of reaction to about 70° C. Toward the end of the addition of acetaldehyde, a small amount of refluxing usually occurs for a short time, so that it is necessary that the condenser be equipped with brine or ice water to prevent the escape of acetaldehyde. After all the acetaldehyde has been added and no more refluxing of the aldehyde occurs, the mixture is maintained at 80–85° C. for about two hours to insure completion of the reaction. At this time, twenty-seven parts by weight of formaldehyde solution (37–40%) is added, whereupon the temperature rises about 10°. It is desirable to maintain the temperature above 85° C., as at lower temperatures the product becomes so stiff that difficulty is experienced in stirring. After the addition of the formaldehyde, stirring is continued for about two hours to allow for complete reaction after which vacuum is slowly applied and the water removed. After drying, the melted resin is drawn off into suitable containers and allowed to cool, when it is ready, after grinding, for use in rubber as an accelerator of vulcanization.

It will, of course, be understood that the process is not limited to the exact conditions given in the above example; these conditions, including times, temperatures, and proportions of reagents, may be varied considerably without departing from my invention.

The aldehyde-amine which I prefer to treat with formaldehyde is derived from acetaldehyde and aniline, but as I have indicated above, straight or open chain aldehydes in general may be employed, and in place of aniline there may be used other aromatic (cyclic) amines such as the toluidines, naphthylamines, p-phenylene-diamine, and other mono- and poly-amines, to all of which may be applied the term: arylamine. In place of formaldehyde, other equivalent substances containing active methylene groups may be used.

The new formaldehyde derivatives constituting part of my invention may be referred to generically as methylene-alkylidene-arylamine compounds in which the alkylidene group contains more than one carbon atom.

I claim:

1. A process of treating rubber which comprises combining rubber with a vulcanizing agent and a polyaldehyde derivative of an aldehyde amine reaction product and vulcanizing the rubber mix.

2. A process of treating rubber which comprises combining rubber with a vulcanizing agent and a methylene-alkylidene-arylamine in which the alkylidene group contains more than one carbon atom, and vulcanizing the rubber mix.

3. A process of treating rubber which comprises combining rubber with a vulcanizing agent and a formaldehyde derivative of the condensation product of an aromatic primary amine and a straight chain aldehyde, and vulcanizing the rubber mix.

4. A process of treating rubber which comprises combining rubber with a vulcanizing agent and a formaldehyde derivative of the condensation product of an aromatic primary amine and acetaldehyde, and vulcanizing the rubber mix.

5. A process of treating rubber which comprises combining rubber with a vulcanizing agent and a material obtainable by treating with formaldehyde the condensation product of one molecular proportion of an aromatic amine and more than one molecular proportion of a straight chain aldehyde, the formaldehyde having been used in an amount sufficient to substantially increase the hardness or viscosity of said condensation product, and vulcanizing the rubber mix.

6. A process of treating rubber which comprises combining rubber with a vulcanizing agent and a material obtainable by treating with formaldehyde the condensation product of one molecular proportion of an aromatic primary amine and about one and one half molecular proportions of acetaldehyde, between about one-third and one molecular proportion of formaldehyde being used for each molecular proportion of the aromatic primary amine, and vulcanizing the rubber mix.

7. A rubber product derived from rubber combined with the polyaldehyde derivative of an aldehyde amine reaction product and vulcanized.

8. A rubber product derived from rubber combined with the formaldehyde derivative of the condensation product of a straight chain aldehyde and an aromatic primary amine, and vulcanized.

9. A rubber product derived from rubber combined with the formaldehyde derivative of the condensation product of acetaldehyde and aniline, and vulcanized.

10. The process of producing vulcanized rubber, which comprises heating a mixture of rubber, sulfur, with the polyaldehyde derivative of an aldehyde amine reaction product.

11. The process of producing vulcanized rubber, which comprises heating a mixture of rubber and sulfur with a formaldehyde derivative of a compound formed by the union of three molecular proportions of acetaldehyde with two molecular proportions of aniline.

In testimony whereof I affix my signature.

WINFIELD SCOTT.